United States Patent Office 3,317,164
Patented May 2, 1967

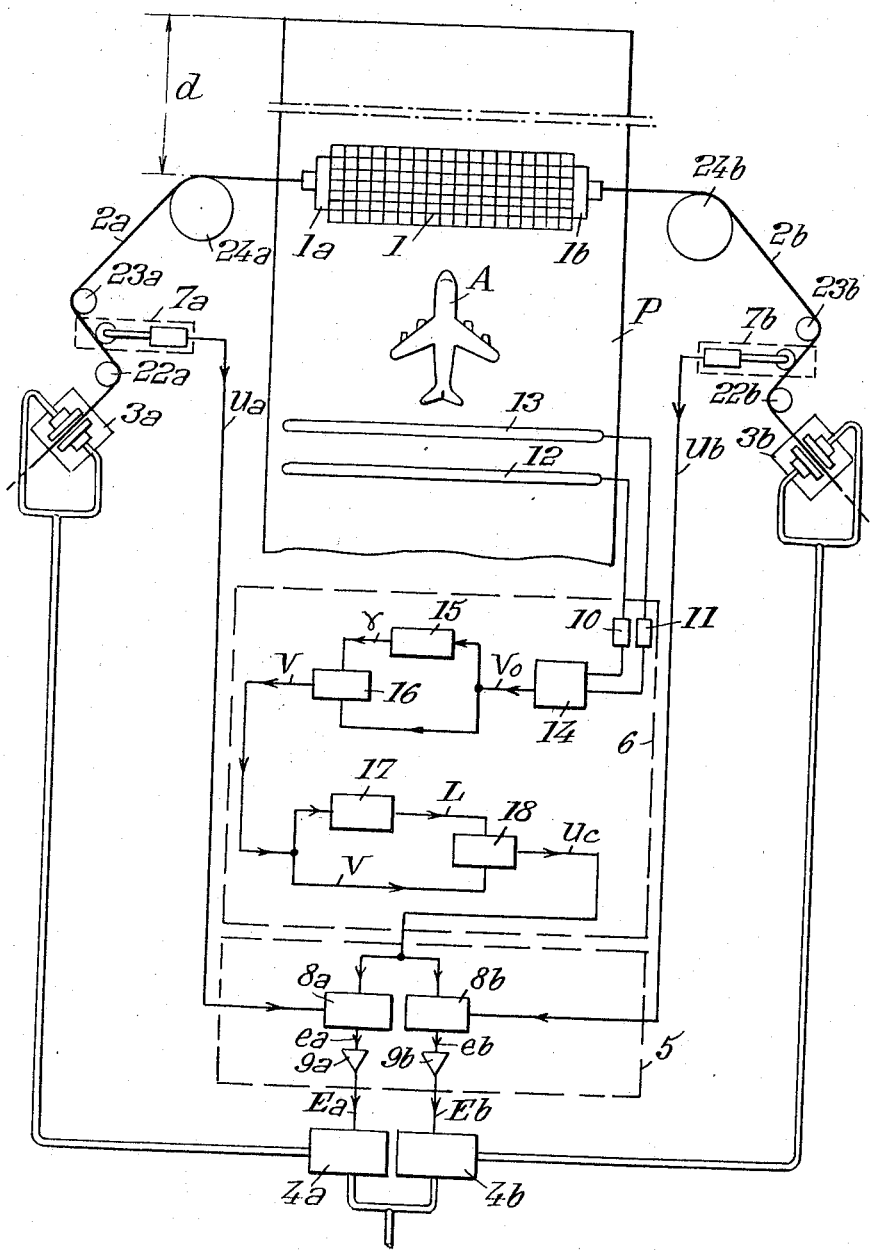

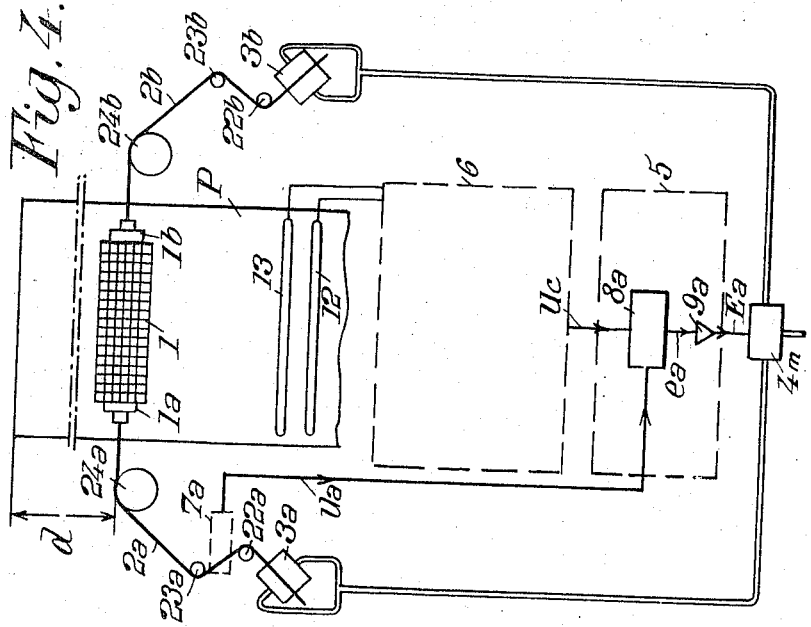
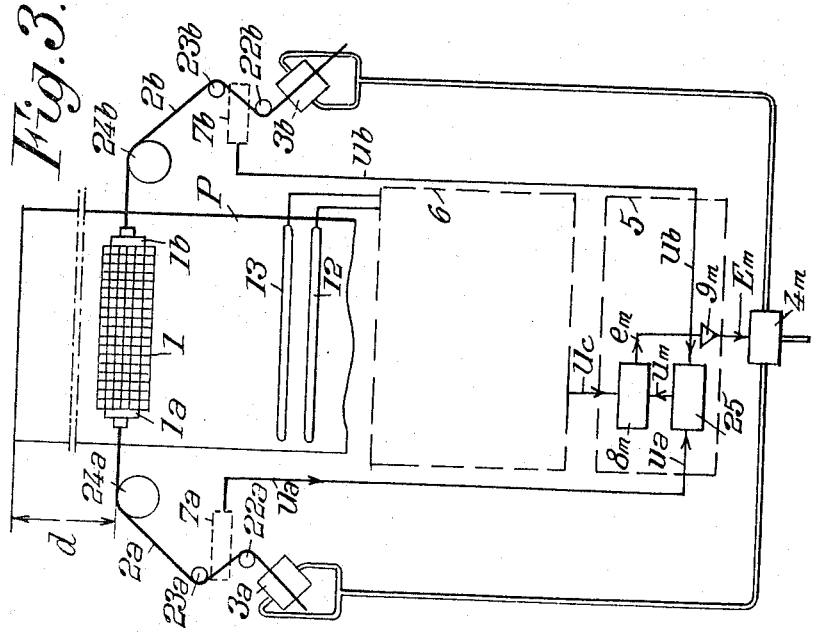

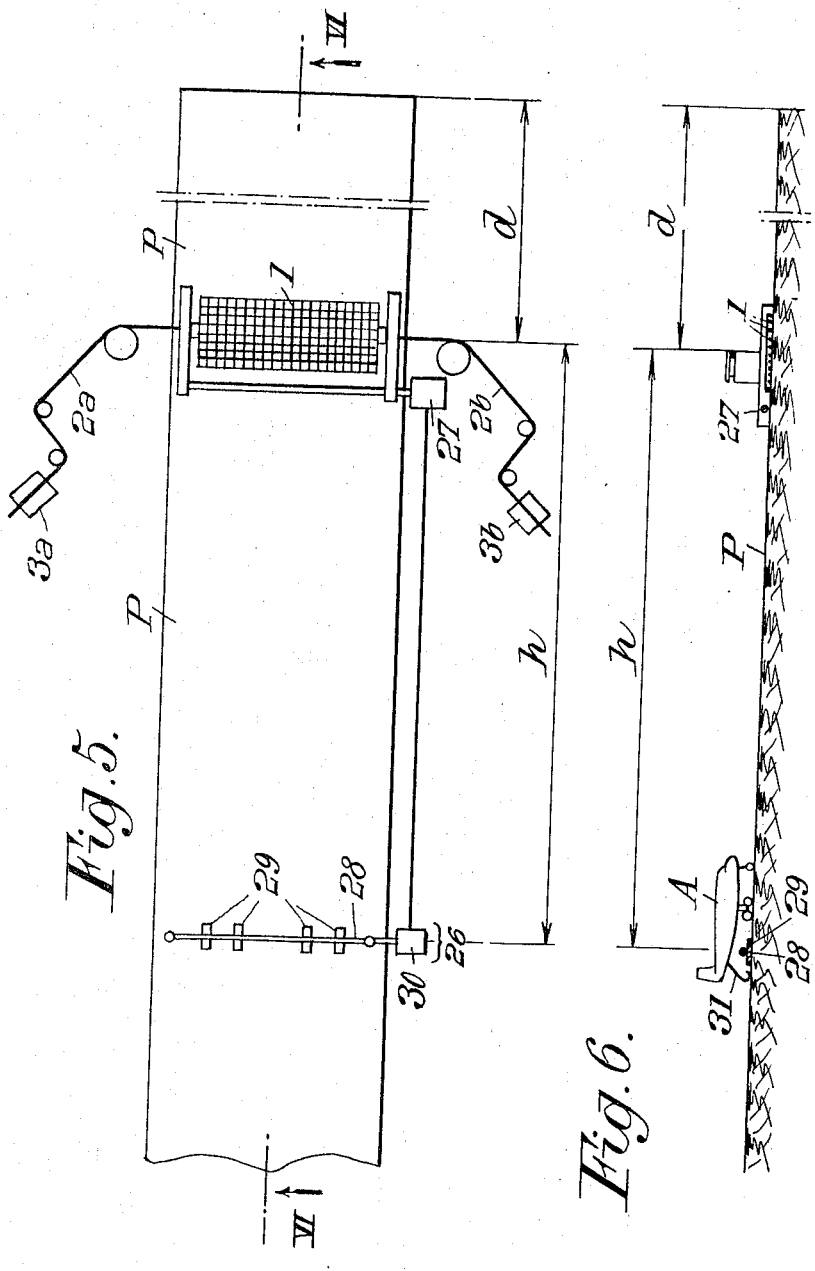

3,317,164
AIRCRAFT ARRESTING GEARS
Claude Louis Edouard Marcheron, Montrouge, France, assignor to Societe d'Exploitation des Materiels Hispano-Suiza, Bois-Colombes, Seine, France
Filed Oct. 21, 1965, Ser. No. 499,621
Claims priority, application France, Nov. 12, 1964, 994,650
14 Claims. (Cl. 244—110)

The present invention relates to arresting gears for movable bodies, and in particular to aircraft arresting gears, comprising a barrier secured to a flexible holding link, strap or cable, itself subjected to the action of a braking device, whereby the movement of the body, or aircraft, is stopped by its engagement with said barrier.

The object of the present invention is to provide an arresting gear of this type which is better adapted to meet the requirements of practice than those known up to this time.

According to the present invention, the braking device is actuated by a servo-control arrangement delivering an electric signal resulting from the comparison between:

On the one hand, an optimum value of the speed of displacement of the flexible holding link, called "assigned value," elaborated by an electronic calculator from, in particular, the speed of the movable body (aircraft) when it is about to engage the barrier, a stopping distance fixed in advance, and a transfer function which depends essentially upon the geometry, the dimensions and the number of flexible holding links of the gear, and On the other hand, the instantaneous value of the speed of displacement of said flexible holding link, advantageously measured at the place where said link leaves the braking device, Said electrical signal acting upon the servo-control arrangement in such manner that the braking effort exerted at any time on the flexible holding link causes the instantaneous value of its speed of displacement to tend toward the assigned value thereof.

Preferred embodiments of the present invention will be hereinafter described with reference to the appended drawings, given merely by way of example, and in which:

FIG. 2 is a diagrammatical view showing another embodiment of this arresting gear;

FIGS. 3 and 4 show, in the same conditions as FIG. 2 but on a smaller scale, two modifications of the embodiment of FIG. 2;

FIG. 5 is a diagrammatic plan view illustrating a complementary feature of the invention;

FIG. 6 is a longitudinal sectional view on the line VI—VI of FIG. 5.

Figure 1:
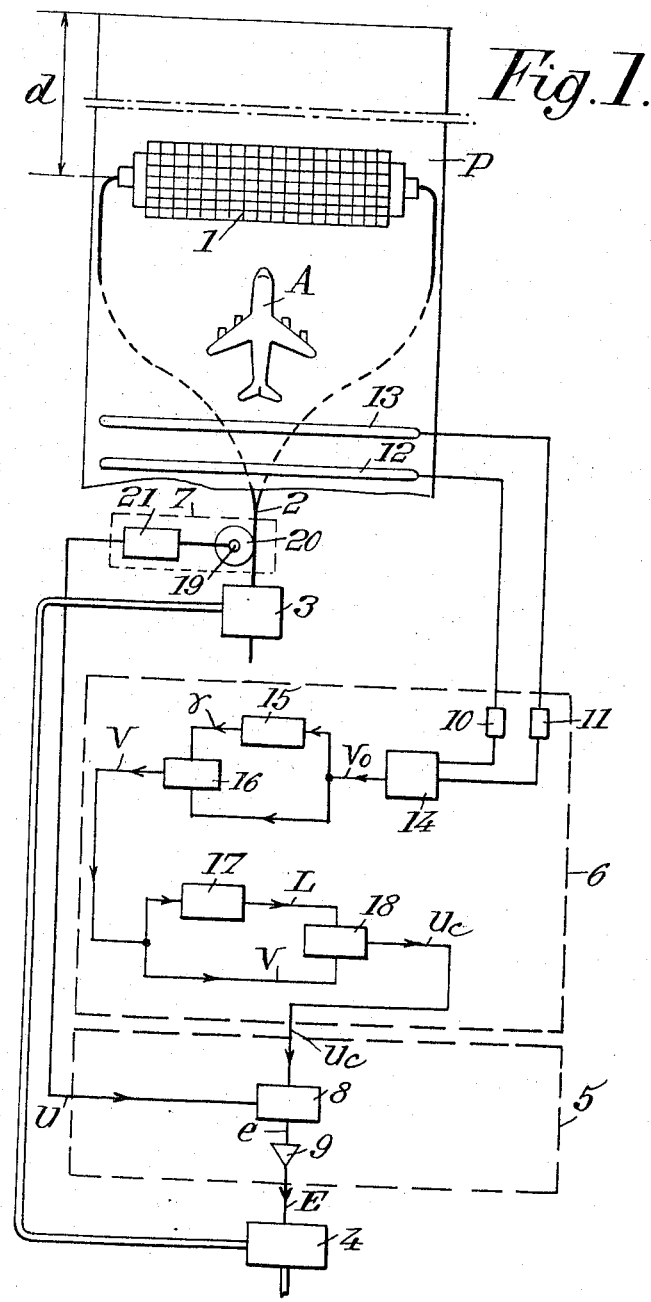
FIG. 1 is a diagrammatical view showing an embodiment of the arresting gear according to the invention.

The following description, with reference to the drawings, relates to an arresting gear for use in an airfield adapted to receive various types of aircraft of different weights, P designating a track for an aircraft A.

The barrier 1 may be of any suitable construction and it is supposed in FIG. 1 to consist of a net.

When the aircraft engages barrier 1, the latter drives at least one flexible holding link, or cable, 2 subjected to the action of at least one braking device 3 (preferably of the hydraulic type) mounted in fixed position and actuated through a servo-control device 4.

According to the present invention, servo-control device 4 is operated through an electronic regulator 5 delivering an electric signal E resulting from the comparison between, on the one hand, an assigned value Uc of the speed of displacement of holding cable 2, and, on the other hand, an instantaneous value U of the speed of displacement of said holding link measured as it leaves braking device 3.

Concerning the assigned value Uc of the speed of displacement of holding cable 2 it is elaborated in an electronic calculator 6 from, in particular, The speed Vo of the aircraft when it engages barrier 1,
A predetermined stopping distance d, and
A transfer function which depends essentially upon the geometry and the dimensions of the holding link 2 of the arresting gear.

It should be stated that, in order to reduce to a minimum the possible injuries undergone by the aircraft engaging barrier 1, it is of interest, on the one hand, to use the whole of the stopping distance d, whatever be the type and in particular the weight of the aircraft, and, on the other hand, to stop the aircraft by applying thereto a uniform deceleration $\gamma$, the value of this deceleration being then equal to $$\frac{V_o^2}{2d}$$

As for the instantaneous value U of the speed of displacement of holding cable 2, it is measured at the output of braking device 3 by a detector device 7, which will be hereinafter more fully described.

The electric signal E then acts upon servo-control device 4 in such manner that the braking effort exerted at any time by braking device 3 upon holding cable 2 causes the instantaneous value U of its speed of displacement to tend toward the assigned value Uc thereof.

For this purpose, it is possible to use the embodiment illustrated by FIG. 1, where it has been supposed, for the sake of simplicity, that barrier 1 is linked with a single holding cable 2 itself subjected to the action of a single braking device 3.

According to this embodiment, regulator 5 comprises a comparator cell 8 receiving, at the input thereof, both the assigned value Uc and the instantaneous value U of the speed of displacement of holding cable 2.

A comparator cell 8 delivers an electric signal e, characterized by its sign and its absolute value, which is amplified in an amplifier cell 9 delivering electric signal E.

Signal E then acts upon servo-control device 4, which advantageously consists of a pressure controlled servo-valve, so that the braking effort exerted at any time upon holding link 2 causes the instantaneous value U to tend, by continuous variation, toward the assigned value Uc.

Concerning calculator 6, which elaborates the assigned value Uc of the speed of displacement of holding cable 2, it may advantageously include the following elements:

A device for measuring the speed of aircraft A just before it engages barrier 1, which device may comprise two signal producing means 10 and 11, for instance of the pneumatic type, the detecting means, respectively 12 and 13, associated with 10, 11 being disposed at different respective distances upstream of barrier 1 whereby the two above mentioned means 10 and 11 deliver two successive electric pulses the analysis of which in an operator cell 14, permits of determining the speed Vo of the aircraft at the time it is going to engage barrier 1, A multiplying cell 15, receiving the signal representative of Vo from operator cell 14 and delivering a signal representative of the desired constant deceleration $$\gamma = \frac{V_0^2}{2d}$$

An integrating cell 16 receiving the signal representative of $\gamma$ and the signal representative of Vo and delivering a signal representative of the speed V of the aircraft at a given time, after its engagement with barrier 1, said speed V being equal to $$V = V_o - \int \gamma \, dt$$

An integrating cell 17 receiving the signal representative of V and delivering a signal representative, at any time, of the distance L travelled over by the aircraft since its passage over detecting means 12 and 13, that is to say, with a difference of some yards, since the engagement of the aircraft into barrier 1, and A multiplier cell 18 receiving the signal representative of L and the signal representative of V, said multiplier cell 18 calculating, account being taken of the law imposed by the transfer function, the assigned value of the rate of movement of holding cable 2.

As for the detector device 7 which measures, near braking device 3, the instantaneous value U of the speed of displacement of holding cable 2, it is constituted by the following elements:

A tachometric dynamo 19 keyed on the shaft of a wheel 20 the rim of which, bearing upon holding cable 2, is driven directly by said cable, and An operator cell 21 receiving from said dynamo 19 an indication relative to the speed of revolution of wheel 20, said cell 21 delivering a signal representative of U, such that:

$$U = n \cdot r$$

$n$ representing the speed of rotation of wheel 20, in radian per second, and $r$ representing the radius of said wheel.

The following description now relates to an embodiment which is more elaborate and of a more common application, wherein barrier 1, which extends across track P, comprises two independent flexible holding links such for instance as two straps 2a and 2b starting respectively from the ends 1a and 1b of said barrier 1.

According to the embodiments illustrated by FIGS. 2, 3 and 4, each of these two straps 2a and 2b is subjected to the action of a hydraulic braking device, 3a for strap 2a and 3b for strap 2b, which braking devices are, for instance, of the jaw type.

Strap 2a passes between the jaws of braking device 3a, then over two guiding pulleys 22a and 23a and over a main guiding pulley 24a located on the corresponding side of track P and at the level of said barrier 1, so as to be secured to the end 1a of said barrier.

In a likewise manner, strap 2b passes between the jaws of braking device 3b, then over guiding pulleys 22b and 23b and over a main guiding pulley 24b located on the other side of track P and at the height of barrier 1, so as to be fixed to the end 1b of said barrier.

It is then possible, as shown by FIG. 2, to arrange regulator 5 in such manner that it delivers an electric signal Ea relative to the control of strap 2a and an electric signal Eb relative to the control of strap 2b.

Electric signal Ea acts upon a pressure controlled servo-valve 4a, which actuates braking device 3a in such manner that the braking effort exerted at any time upon strap 2a causes the instantaneous value Ua of its speed of displacement to tend toward the assigned value Uc of said rate, elaborated as hereinafter indicated.

In a similar manner, electric signal Eb acts upon a pressure actuated servo-value 4b, which actuates braking device 3b in such manner that the braking effort exerted upon strap 2b causes the instantaneous value Ub of its speed of displacement to tend toward the assigned value Uc thereof, elaborated as it will be hereinafter indicated.

For this purpose, regulator device 5 comprises:

Two comparator cells 8a and 8b, cell 8a receiving both the assigned value Uc and the instantaneous value Ua whereas comparator cell 8b receives simultaneously both the assigned value Uc and the instantaneous value Ub, said cells 8a and 8b delivering electric signals ea and eb, respectively, and Two amplifier cells 9a and 9b, which receive ea and eb, and deliver Ea and Eb, respectively.

The assigned speed value Uc is supplied by a calculator 6 similar to that above described, with the exception of multiplier cell 18 which must take into account a transfer function different from the transfer function of the preceding case (the same reference numerals representing in FIG. 2, concerning calculator 6, the same elements as in FIG. 1).

Concerning the detection of the instantaneous values Ua and Ub of the respective speeds of displacement of straps 2a and 2b, two detector devices 7a and 7b are provided. Detector device 7a is located between guiding wheels 22a and 23a, whereas detector device 7b is located between guiding wheels 22b and 23b.

In the modification illustrated by FIG. 3 regulator 5 is arranged to deliver a single electric signal for the control of both of the straps 2a and 2b.

The electric signal Em acts upon a pressure control servo-valve 4m, common to both of the braking devices 3a and 3b, in such manner that the braking force exerted at any time upon straps 2a and 2b causes an instantaneous means value Um of their respective instantaneous speeds Ua and Ub to tend toward the assigned value Uc of said speed, this assigned value Uc being elaborated by calculator 6.

For this purpose, in order to elaborate said instantaneous value Um and to utilize it, regulator 5 comprises the following elements:

A discriminator cell 25 receiving both of the instantaneous values Ua and Ub of the speeds of displacement of straps 2a and 2b and delivering the instantaneous mean value Um of said speeds;

A comparator cell 8m receiving the assigned value Uc and the instantaneous mean value Um, said last mentioned cell Um delivering a single electric signal em, and An amplifier cell 9m receiving a signal em and delivering a signal Em.

Calculator 6, which elaborates the assigned value Uc of the displacement speed is identical to that above described with reference to the embodiment of FIG. 2.

In a likewise manner since both of the instantaneous values Ua and Ub are brought into play, two detector devices 7a and 7b are provided at the respective outputs of braking devices 3a and 3b.

Finally, as shown by FIG. 4, regulator 5 may be arranged in such a manner as to deliver a single electric signal Ea relative to one of the two straps, for instance strap 2a.

Electric signal Ea then acts upon the pressure control servo-valve 4m common to both of the braking devices 3a and 3b, in such manner that the braking force exerted at any time upon strap 2a causes the instantaneous value Ua of the speed of strap 2a to tend toward the assigned value Uc of said speed, the braking force exerted upon strap 2b being then the braking force exerted upon strap 2a.

Calculator 6 which elaborates the assigned value Uc of the speed of displacement is identical to those described with reference to FIGS. 2 and 3 but a single detector device 7a is provided at the output of braking device 3a.

Concerning the embodiment of FIG. 2, and the modifications illustrated by FIGS. 3 and 4, it should be noted that, In an arresting gear made according to the embodiment of FIG. 2, the speeds of displacement of the two straps are controlled independently of each other from the instantaneous value of the speed of displacement of each of them, respectively, In an arresting gear according to FIG. 3, the speeds of displacement of both straps are controlled by a single servo-control device, from an instantaneous mean value of that speed of displacement, and In an arresting gear according to FIG. 4, the speeds of displacement of both straps are controlled by a single servo-control device from the instantaneous value of the speed of displacement of one of the two straps.

An arresting gear according to the present invention, in particular according to one of the four embodiments above described, has, among other advantages, that of being adapted to aircrafts of very different weights. This is due to the fact that once the constructive parameters of the system (maximum weight of the aircraft to be stopped, maximum speed at the time it engages the barrier, stopping distance, . . . etc.) have been set, there is no adjustment to be provided for obtaining that the aircraft, whatever be its weight and the speed at which it engages the barrier, is stopped in the best possible conditions of safety, since the whole of the stopping distance is used and the negative acceleration is kept at a constant value.

The only external action to be exerted will be that bringing into play the mechanism for shifting barrier 1 from a retracted position to an active position where it constitutes, at the end of the track, an obstacle for the aircraft to be stopped.

Such an action may be exerted by the pilot of aircraft A according to a complementary feature of the invention illustrated by FIGS. 5 and 6.

For this purpose, a system of release means 26 is connected, preferably in an electric manner, to the lifting mechanism 27 which causes barrier 1 to shift from its retracted position to its active position, said release means 26 being, according to the aircraft pilot's will, either operative or inoperative when the aircraft reaches said means 26.

Such release means 26 are located upstream of barrier 1, at a distance $h$ chosen in accordance, on the one hand, with the maximum speed that aircraft A may have as it reaches said means, and, on the other hand, with the time required by barrier 1 to shift from its retracted position to its active position.

Advantageously, as shown, said release means comprise,

A cable 28 stretched across track P and held at some centimeters above said track by a plurality of supports 29, and A relay 30 which, switching from one position to the other when cable 28 is torn off by a hook 31 carried by aircraft A, electrically starts lifting mechanism 27 into operation.

Said release means 26 remain inoperative if the pilot keeps hook 31 lifted (aircraft A rolling over the cable without tearing it off), whereas said means becomes operative if the pilot lowers hook 31 so that it contacts track P (hook 31 tears the cable off, which causes relay 30 to swing and starts lifting mechanism 27).

Of course the mechanism according to the present invention might be used to control other movable bodies than aircrafts running along a track, for instance free dropping movable bodies.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For use to stop a body with respect to the ground an arresting gear which comprises, in combination, a barrier extending across the path of travel of said body on the ground, holding means for said barrier comprising at least one flexible link secured to said barrier, mounted in fixed position on the ground, a braking device for braking said flexible link, means on the ground ahead of said barrier for measuring the speed of said body as it is going to strike said barrier, an electronic calculator having its input connected with the output of said speed measuring means for determining the assigned speed of displacement of said flexible link, a device for measuring the actual speed of displacement of said flexible link, electronic regulator means having two inputs connected to the respective outputs of said electronic calculator and of said measuring device for supplying, at the output of said regulator means, a signal representative of the comparison between the indication of said two respective outputs, and a servo-control device having its input connected with the output of said regulator means and its output connected with said braking device to control it to tend to make the output of said measuring device equal to the output of said electronic calculator.

2. An aircraft arresting gear for use an on airfield track which comprises, in combination, a barrier extending across said track, holding means for said barrier comprising at least one flexible link secured to said barrier, mounted in fixed position on the airfield, a braking device for braking said flexible link, means on the airfield ahead of said barrier for measuring the speed of an aircraft as it is going to strike said barrier, an electronic calculator having its input connected with the output of said aircraft speed measuring means for determining the assigned speed of displacement of said flexible link to obtain a negative acceleration of the aircraft equal to the square of said aircraft speed divided by twice a fixed distance which is that over which said aircraft is stopped after having struck said barrier, a device for measuring the actual speed of displacement of said flexible link, electronic regulator means having two inputs connected to the respective outputs of said electronic calculator and of said measuring device for supplying, at the output of said regulator means, a signal representative of the comparison between the indications of said two respective outputs, and a servo-control device having its input connected with the output of said regulator means and its output connected with said braking device to control it to tend to make the output of said measuring device equal to the output of said electronic calculator.

3. An aircraft arresting gear according to claim 2, wherein said electronic calculator comprises:

a multiplier cell having its input connected with the output of said aircraft speed measuring means and delivering at its output a signal representative of said negative acceleration, a first integrating cell having its two inputs connected respectively with the output of said multiplier cell and with the output of said aircraft speed measuring means and delivering at its output a signal representative of the assigned speed of the aircraft at a given time after its engagement with the arresting barrier, a second integrating cell having its input connected with the output of said first integrating cell and delivering at its output a signal representing at any time the distance over which the aircraft has moved since its engagement with the arresting barrier, and a multiplier cell having its two inputs connected respectively with the output of said second integrating cell and with the output of said first integrating cell, said multiplier cell delivering, at its output, in accordance with a predetermined law of transfer, the assigned value of the speed of displacement of the holding link.

4. An aircraft arresting gear according to claim 2, further comprising, at the output of said braking device, a detector device adapted to measure the instantaneous actual value of the speed of displacement of said holding link, said detector device comprising a wheel the rim of which bears upon said holding link to be driven directly by it, a tachometric dynamo keyed on the shaft of said wheel, and an operator cell having its input connected with the output of said dynamo and delivering, at its output a signal representative of the instantaneous value of the speed of displacement of said holding link.

5. An aircraft arresting gear according to claim 2, comprising a single holding link driven by said arresting barrier and a single braking device acting on said link, said electronic regulator comprising a comparator cell to which are applied, at the two inputs thereof, respectively, the assigned value and the instantaneous value of the speed of displacement of said holding link, said comparator cell delivering at its output an electric signal transmitted to said servo-control device.

6. An aircraft arresting gear according to claim 2, comprising two independent holding links driven by said arresting barrier, said two links consisting of two straps starting respectively from the ends of said arresting barrier, with a braking device for each of said two straps, respectively, said electronic regulator being arranged to deliver, on the one hand, an electric signal relative to the operation of the servo-control device of the braking device of one of the straps, and, on the other hand, an electric signal relative to the operation of the servo-control device of the braking device of the other strap.

7. An aircraft arresting gear according to claim 6, wherein said electronic regulator comprises two comparator cells adapted to receive, respectively, one, the assigned value and the instantaneous value of the speed of displacement of one first strap, and, the other, the assigned value and the instantaneous value of the speed of displacement of the other strap, said two comparator cells delivering at their outputs electric signals adapted to act upon the respective servo-control means of the braking devices of the two straps, respectively.

8. An aircraft arresting gear according to claim 2, comprising fixed to the arresting barrier, two independent holding links, consisting of two straps starting respectively from the two ends of said barrier, with a braking device for each of these two straps, respectively, said electronic regulator being arranged to deliver a single electric signal for the operation of said servo-control device which is common to both of the respective braking devices of the two straps.

9. An aircraft arresting gear according to claim 8, wherein said electronic regulator comprises,
- a discriminator cell adapted to receive, at its inputs, the two instantaneous values of the respective speeds of displacements of the two straps, said discriminator cell delivering at its output an instantaneous mean value of said speeds of displacements, and
- a comparator cell receiving, at its inputs, on the one hand, the assigned value of the strap displacement speed, and, on the other hand, said instantaneous mean value, said cell being arranged to deliver at its output a single electric signal acting upon the servo-control means of the braking devices of the two straps.

10. An aircraft arresting gear according to claim 2, comprising, fixed to the arresting barrier, two independent holding links consisting of two straps starting respectively from the two ends of said barrier, with a braking device for each of these two straps, respectively, said electronic regulator being arranged to deliver a single electric signal to said servo-control device, which is common to both of to said braking devices, said single electric signal being elaborated from the instantaneous speed of displacement of only one of said two straps.

11. An aircraft arresting gear according to claim 2, further comprising a lifting mechanism intended to shift the arresting barrier from a retracted position thereof to an active position thereof, and release means operatively connected with said lifting mechanism and capable, at the aircraft pilot's will, of being operative or inoperative when the aircraft passes along them.

12. An aircraft arresting gear according to claim 11, wherein said release means are disposed upstream of the arresting barrier at a distance thereof chosen on account, on the one hand, on the maximum speed that the aircraft may reach when passing along said release means, and on the other hand, of the time taken by the barrier to shift from its inoperative to its active position under the action of said lifting mechanism.

13. An aircraft arresting gear according to claim 11, wherein said release means comprise a cable stretched across the airfield track and releasably held some centimeters above said track, a hook movably carried by the aircraft adapted to engage said cable, and a relay, adapted to switch over when said cable is torn off by said hook, for electrically starting said lifting mechanism into operation.

14. An aircraft arresting gear according to claim 13 wherein said release means are arranged to be inoperative if the aircraft pilot keeps the hook of his aircraft lifted, whereas said means become operative if the pilot lowers the hook so that it runs in contact with the surface of the airfield track.

References Cited by the Examiner

UNITED STATES PATENTS 3,245,728   4/1966   Brooks _____ 303—21

MILTON BUCHLER, *Primary Examiner.*

P. E. SAUBERER, *Assistant Examiner.*